(12) United States Patent
Tolt

(10) Patent No.: US 8,102,108 B2
(45) Date of Patent: Jan. 24, 2012

(54) LOW VOLTAGE ELECTRON SOURCE WITH SELF ALIGNED GATE APERTURES, FABRICATION METHOD THEREOF, AND DEVICES USING THE ELECTRON SOURCE

(76) Inventor: Zhidan Li Tolt, San Jose, CA (US)

( * ) Notice: Subject to any disclaimer, the term of this patent is extended or adjusted under 35 U.S.C. 154(b) by 225 days.

(21) Appl. No.: 11/929,615

(22) Filed: Oct. 30, 2007

(65) Prior Publication Data

US 2009/0039754 A1    Feb. 12, 2009

Related U.S. Application Data

(63) Continuation-in-part of application No. 10/707,342, filed on Dec. 5, 2003, now Pat. No. 7,459,839.

(51) Int. Cl.
*H01J 1/46* (2006.01)

(52) U.S. Cl. .......................... 313/293; 313/497; 313/310

(58) Field of Classification Search .......... 313/495–497, 313/293–304, 306, 309–310, 346, 351, 355
See application file for complete search history.

(56) References Cited

U.S. PATENT DOCUMENTS

| | | | |
|---|---|---|---|
| 6,283,812 B1* | 9/2001 | Jin et al. | 445/24 |
| 6,538,367 B1* | 3/2003 | Choi et al. | 313/309 |
| 6,692,324 B2* | 2/2004 | Simpson et al. | 445/24 |
| 2003/0092207 A1* | 5/2003 | Yaniv et al. | 438/20 |
| 2004/0104660 A1* | 6/2004 | Okamoto et al. | 313/346 R |
| 2005/0127351 A1* | 6/2005 | Tolt | 257/10 |
| 2005/0258739 A1* | 11/2005 | Park et al. | 313/497 |
| 2006/0043872 A1* | 3/2006 | Jeong | 313/495 |
| 2006/0097615 A1* | 5/2006 | Tsakalakos et al. | 313/309 |

* cited by examiner

*Primary Examiner* — Nimeshkumar Patel
*Assistant Examiner* — Donald Raleigh

(57) ABSTRACT

A method of fabricating an electron source having a self-aligned gate aperture is disclosed. A substrate is deposited on a first conductive layer. Over the first conductive layer an emitter layer is deposited. The emitter layer includes one or a plurality of spaced-apart nano-structures and a solid surface with nano-structures protruding above the surface. An insulator is conformally deposited over the emitter layer surface and forms a post from each protruding nano-structure. A second conductive layer is deposited over the insulator and the second conductive layer and the insulator are removed from the nano-structures such that apertures are formed in the second conductive layer and at least the ends of the nano-structures are exposed at the centers of said apertures.

29 Claims, 13 Drawing Sheets

LOW VOLTAGE ELECTRON SOURCE WITH SELF ALIGNED GATE APERTURES, FABRICATION METHOD THEREOF, AND DEVICES USING THE ELECTRON SOURCE

CROSS REFERENCE TO RELATED APPLICATIONS

This application is also a continuation in part of U.S. application Ser. No. 11/927,323, filed on Oct. 29, 2007, published on Oct. 23, 2008, as U.S. 2008/0261337 A1, and titled "LOW VOLTAGE ELECTRON SOURCE WITH SELF ALIGNED GATE APERTURES, FABRICATION METHOD THEREOF, AND LUMINOUS DISPLAY USING THE ELECTRON SOURCE."

This application is a continuation-in-part of U.S. application Ser. No. 10/707,342, filed on Dec. 5, 2003, published on Jun. 16, 2005, as U.S. 2005/0127351 A1, and titled "LOW VOLTAGE ELECTRON SOURCE WITH SELF ALIGNED GATE APERTURES, FABRICATION METHOD THEREOF, AND LUMINOUS DISPLAY USING THE ELECTRON SOURCE," the disclosure of which is incorporated herein by reference in its entirety.

This application is related to U.S. application Ser. No. 11/842,938, filed on Aug. 21, 2007, U.S. application Ser. No. 10/807,890, filed on Mar. 24, 2004, U.S. application Ser. No. 11/467,880 filed on Aug. 28, 2006 and U.S. application Ser. No. 11/467,876 filed on Aug. 28, 2006, the disclosures of all of which are incorporated herein by reference in their entireties.

FIELD OF THE INVENTION

The present invention relates to an emission electron source using nano-structures as emitters and self-aligned and nano-sized gate aperture for low voltage control, the fabrication method thereof and its use in flat panel display and x-ray generator.

DESCRIPTION OF THE RELATED ART

There has been broad interest in the field emission application of nano-structured materials because of their inherited high aspect ratio. Among various materials, Carbon nanotube (CNT) appears the most promising. Numerous studies have reported the advantageous emission properties of CNT. It has a threshold field as low as 1 to $2\times10^6$ V/m, a low electron energy spread, and can carry a current as high as 500 nA (nano-Amperes) per tube. Its extraordinary high electrical and thermal conductivity as well as strong chemical and mechanical stability make it an ideal field emitter.

Potential applications of a CNT field emission device include flat panel displays, 2D sensors, direct writing e-beam lithography, microwave amplifiers, x-ray generator, electron microscopy, as well as various other instrumentations. However, all of these applications demand the device to meet part or all of the following requirements: 1) ability to modulate electron emission at a low voltage, ideally, less than 10V; 2) high emission current density; 3) high emission uniformity over large area; 4) high energy efficiency; 5) resistance to ion bombardment; 6) chemical and mechanical robustness; 7) generation of collimated or focused electron beam. The importance of the ability to modulate a source at low voltage can hardly be over stressed. The cost of a device driver, which often is a major cost component, power consumption, as well as device miniaturization, and ability to operate at high frequency are all depend on the modulation voltage. To achieve low voltage emission modulation, a gate electrode has to be fabricated in the vicinity of the emitter to control the emission. To modulate emission at a voltage less than 10 V, this distance has to be close to one micrometer or less. High emission current density and high emission uniformity requires a high emission site density and high emission homogeneity between the sites. For display applications, for example, a minimum emission site density of $10^6/cm^2$ (equivalent to 25 emitters in a 50 μm×50 μm pixel) is required. High energy-efficiency requires both a low gate current and a low modulation voltage. For a field emission device of a meaningful lifetime and stable electron emission, the emitter material as well as device structure have to be chosen in order that the emitter is able to sustain ion bombardment and chemical erosion from active species in the device operating environment.

Despite the superior emission properties of a single CNT, the current state of the art of a CNT electron source does not meet most of the above requirements and, therefore, has not found any product applications yet, despite the appearance of some prototype flat panel displays. The major challenges and problems include:

a) Insufficient Growth Control in CNT Length, Diameter and Spacing Between Them

CNT tends to grow in a wide range of length on the same sample even in a small proximity. As a result, each CNT will have a different aspect ratio and a different distance from the gate electrode, should an integrated gate electrode be built. Those CNTs with a higher aspect ratio and proximity closer to the gate will experience a stronger extraction field and, therefore, emit electrons first and with a higher current density, and in the end, burn out faster. CNT growth requires a catalyst. The diameter and spacing between CNTs is determined by the catalyst size and spacing. With a continuous layer of catalyst, CNT grow densely, causing electrostatic screening effect between neighboring CNTs. The result is an array of highly oriented and densely packed CNT, which will hardly emit electrons. The diameter of the CNT is also random, again causing variation in aspect ratio. In prior art, the spacing between CNTs is controlled by patterning catalyst into array of particles before the CNT growth using either e-beam lithography or a mono-layer of nano polymer beads as a mask for the catalyst deposition. Both methods are difficult to implement in production. E-beam lithography is so slow and expensive that it is ill suited for any meaningful operation. Applying a mono-layer consistently over large an area is no easy task.

b) Difficulty in Fabrication of an Integrated Gate Structure

Two obstacles make the fabrication difficult. First, CNT films is sensitive to wet processes. Upon exposure to a wet agent, CNTs either stick to the substrate or to themselves, diminishing their field emission properties. Second, the gate aperture has to be aligned with CNT.

In one of prior art, shown in FIG. 1A, the gate electrode is replaced by a metallic grid mechanically mounted atop of a randomly grown CNT film. Emission modulation using such a grid typically requires a voltage on the order of 1 kV.

In another prior art, shown in FIG. 1B, a gate structure is pre-fabricated using either conventional micro-fabrication or thick film technology. CNTs are then either grown into the gate hole without further processing or screen printed into the gate holes respectively. The problem is that a group of densely grown CNTs in a single gate hole does not emit well because of the strong electrostatic effect amongst them and the variation in their length and aspect ratio. CNTs mixed with other chemicals to facilitate screen-printing into gate hole do not perform well either. In addition, deposition of CNT into the gate hole often cause short circuit between the gate and the cathode electrode, resulting in low production yield.

In a third prior art, shown in FIG. 1C, vertically oriented and mono-dispersed CNT is grown before gate fabrication and the gate aperture is self-aligned with a diameter of at least 2 micrometers. The spacing between CNTs has to be controlled to at least 5 micrometers so that there will be only one CNT in each gate hole. To achieve such a growth, e-beam lithography was used to pattern the catalyst into an array of particles with desirable spacing and size, even though the fabrication of a self-aligned gate aperture does not require lithography.

c) High Modulation Voltage

The diameter of a typical gate aperture fabricated by prior art is typically a few micrometers, while the one fabricated by thick film process can have diameters on the order of tens of micrometers. Therefore, emission modulation voltage for these integrally gated source will be tens to hundreds of volts. For many high frequency applications, these high modulation voltages make the application impossible due to high energy loss and loss of signal fidelity. As for display application, the device become impractical, since conventional CMOS display drivers will not be able to deliver it.

d) Low Emission Site Density

The best performing field emission films today are those randomly grown CNT without exposing further processing. Typically, they have an emission site density on the order of $5\times10^5/cm^2$. For an integrally gated structure, where CNTs are grown or printed in a pre-made gate aperture, there exist large variations among the CNTs, both within the same gate hole as well as from gate hole to gate hole. These variations both in length (thus tip-to-gate distance) and aspect ratio will cause emission to be dominated by those few emitters that experience the highest local electrical field. The diameter of the each gate aperture, which is at best a few micrometers, also puts a limit on the emission site density.

e) Inhomogeneous Emission

The variation in length, diameter and spacing between CNTs discussed above will cause some emitters emit electrons easier. In a display, these dominating sites appear as bright spots on the phosphor screen. And due to higher current, these sites also burn out faster and, therefore, have a short lifetime.

f) Relatively Low Resistance to Ion Bombardment and Erosion from Residual Oxygen Oxygen is one of the major residual gases in most field emission devices. Carbon reacts easily with oxygen, causing emitter erosion. Carbon is also relatively easy to be sputtered by ion bombardment. Accumulated re-deposition of the sputtered Carbon can then causes short circuit between electrodes.

g) Highly Divergent Electron Beam

Since CNT tips tend to point to random direction, the generated electron beam is highly divergent.

h) Low Production Yield

Both growth and screen-printing of CNT into a pre-fabricated gate holes can often cause short circuit between cathode and gate electrodes. The strict requirements of high-resolution photolithography also contribute to lower production yield and high cost.

BRIEF SUMMARY OF THE INVENTION

It is the objective of the current invention to: a) provide a method to fabricate one or multiple self-aligned gate aperture around a single or a small cluster of CNT and with equal distance to each CNT; b) provide a method for controlling CNT growth over large area so that they are either monodispersed or dispersed in small clusters, with a narrow distribution in CNT diameter and the number of CNT in each cluster, and, furthermore, the spacing between the single or cluster of CNT is large enough to enable a gate aperture around each one of them and yet small enough in order that the emitter density can be as high as $10^8/cm^2$; and c) provide a means for enabling favorable wide band gap semiconductor nano-structures to be utilized as field emitters.

It is another object of the invention to provide an electron source using a single or a small cluster of dispersed nano-structures that: a) has emission properties which can be modulated with a low voltage, b) has a high emission site density, c) emits uniformly over large area, d) generate a highly collimated electron beam, e) has high energy efficiency, f) is robust to ion bombardment and chemical attack, and g) is easy to fabricate with high production yield.

It is the third objective of the invention to provide a display using the above electron source.

It is the fourth objective of the invention to provide an x-ray generator using the above electron source.

To achieve the first objective, one or a small cluster of CNT, protruding from the surface and of an average length of one or a few micrometer, are grown or assembled onto a first conductive layer (cathode electrode) extending over a substrate. A dielectric or a combination of materials is then deposited to completely or mostly embed the CNT. Chemical mechanical planarization (CMP) is then performed to truncate the CNT, equalizing the length of each CNT in the array. An etch-back of the embedding dielectric is further applied to allow the CNTs to protrude above the surface. The length of the protruding portion of the CNT can be substantially less than one micrometer. A second conformal insulator layer is then deposited with a controlled thickness, such that one post forms from each single or a small cluster of the protruding CNT. The insulator layer should be thicker than the distances between the CNTs within each cluster such that the original posts from each CNT within the cluster merge into a large one. A second conductive layer for a gate electrode is further deposited over the insulator. The gate metal and the second insulator are then removed by several methods, as is explained in details in the later section of the disclosure, from the nano-structures, leaving a self-aligned aperture in the gate electrode and the insulator around each single CNT or small cluster of CNT. Each gate aperture is spaced from the exposed CNT by a distance equal to the thickness of the insulator, regardless whether the CNT is a single or in a cluster.

Self-alignment of an aperture, as is described in the current invention, means the location where the incline CNT is grown or assembled can be random and needs not be predetermined. The spacing between CNTs, in this invention, may be as low as one micrometer or less. Therefore, two orders of magnitude higher emitter density over prior art is possible and advantages can be taken of CNT growth or assembly controlling processes that don't require expensive and complicated lithography.

One of such enabled embodiments is to use an ion-track-etched membrane as a hard mask for patterning catalyst before CNT growth. Preferred membranes are those with a pore density between $1\times10^5$ to $1\times10^9$ pores/$cm^2$ and pore sizes from 10 nm to a few micrometers. It is known that for CNT growth, its diameter and the inter-tube spacing are determined by those of catalyst. When the catalyst size is less than 200 nm, a single CNT is likely grow from each particles. When membrane with larger pores is used, a small cluster of CNT, 3 to 5 for instance, can grow from each particle. Catalyst deposition through an ion-track-etched membrane with chosen pore size and density will produce an array of catalyst particles with substantially uniform size and desirable average inter-tube or inter-cluster spacing.

The advantages of using the ion-track-etched membranes as a shadow mask for catalyst deposition include: a) pore size and density are in the most desirable range and are highly controlled, b) inexpensive, widely available, and come in sizes particularly suitable for large flat panel display applications, and c) it is easy to apply them to a substrate surface as a shadow mask and they can be recycled in production, provided the catalyst is removed after each deposition. Both the substrate and the membrane can be surface treated so that they attract to each other, resulting a smooth and uniform overlay on the substrate.

Other alternatives of depositing spaced apart and nano-size catalyst particles include nano-stamp and nano-imprint lithography, in which the size, inter space as well as location can be precisely controlled by using either a stamp or a mold prefabricated typically with such technology as e-beam lithography or various other nano-technologies.

Throughout the discussion above, CNT is used as the emitter. However, according to the current invention, the emitter does not have to be CNT. Any conductive nano-structure with high melting pointing and high mechanical and chemical stability can directly replace the CNT. Furthermore, nano-structures of non-conductive materials, particular those of wide band gap semiconductor, such as BN nanotube, and nanowires of AlN, AlGaN, SiC, and GaN can be utilized. Wide band gap semiconductor materials have the most desirable electronic, chemical, mechanical and thermal properties for field emitter, except that they are not conductive. According to the current invention, the problem can be solved by conformally coating these nano-structures with a thin layer of conductive material before the deposition of the embedding dielectric. Or, a conductive material can be used for the entire embedding material. The conductive coating on the non-conductive nano-structure, or the conductive embedding material, will serve to transport electrons from the cathode to or near the tip of the nano-structure.

The completed structure, as is described above, forms an electron source. It comprises of: a first cathode electrode disposed over a substrate, the cathode electrode for providing a source of electrons; an emitter layer being deposed over the cathode electrode and formed from a composition of a embedding material and one or an array of dispersed single or small cluster of nano-structures embedded therein, the emitter layer having a surface parallel to which the nano-structures are truncated to the same length, and above the surface the nano-structures protrude by a fraction of one micrometer; a gate insulator disposed over the emitter layer and having one or array of apertures, each aligned with and exposes a single or a small cluster of nano-structure in the emitter layer; and a gate electrode deposed over the gate insulator and having apertures aligned with each of those in the insulator and spaced from the exposed nano-structure by a distance equal to the thickness of the insulator, the gate electrode for controlling the emission of electrons through the apertures from the exposed nano-structures.

When the steps of depositing and removing gate insulator and gate aperture are repeated, the electron source comprises of multiple electrodes not only for controlling the emission of electrons from the emitter, but also for conditioning the electron beam from the emitter.

The electron source as is described above become addressable when: the first cathode electrode is configured as multiple cathode electrodes each electrically isolated from each other; the gate electrode is configured as multiple gate electrodes, each electrically isolated from each other and intersects with the multiple cathode electrodes; and apertures are formed in the gate electrode and the insulator, each exposes and is aligned with a single or a small cluster of nano-structure from the emitter layer. Activation of a selected cathode and a selected gate electrode will determine one intersection that emits electrons.

In accordance with the current invention, the emitter, whether it is a single nano-structure or a small cluster of nano-structures, will always perfectly located at the center of the aperture regardless its location, and size, and the distance between the aperture and emitter (the emitter-to-gate distance d) is substantially the same over the entire substrate surface, on the order of 100 nm, and controllable by the thickness of the gate insulator. And, all the emitters have substantially the same length and diameter. A gated field emission electron source with these characteristics provides an extra low voltage modulation, uniform emission over large area, and low energy loss from gate current. Since the emitter is largely embedded in a dielectric, it is mechanically and chemically protected and, to some extent, shielded from ion bombardment, giving rise to a longer lifetime and steadier electron emission. With a proper selection, the embedding material can also enhance the thermal conduction from the emitter. When a dielectric is used as the embedding material, the relatively large gap between the cathode and the gate electrodes also reduces the occurrence of a short circuit between them and the capacitive energy consumption during the emission modulation, resulting in a higher production yield and higher energy efficiency. An array of emitters with a density as high as $10^8/cm^2$ will produce a more homogeneous emission compared to those of low emitter density.

The electron source described above can further be fabricated on a non-planar surface such as a concave or other predetermined shape for the purpose of shaping the electron beam.

A display or a lighting device is formed, when the electron source is positioned opposed to and with a vacuum gap from a third anode electrode on which a phosphor screen is deposited. Electrons generated from the emitter by an applied voltage between the cathode and gate electrodes are made incident on the phosphor screen by another positive voltage applied to the anode electrode. Light is generated when the electrons strike the phosphor screen. When a transparent anode electrode is used and it is deposited on a transparent glass substrate, the generated light becomes visible from outside of the device.

The display device described above become fully addressable, when: the cathode electrode is configured as array of strip-like cathode electrodes extending substantially in the same direction and to be spaced and electrically insulated from each other at intervals in the transverse direction; the gate electrode is configured as array of strip-like gate electrodes extending in the direction that intersect with the cathode electrodes and to be spaced and electrically insulated from each other at intervals in the transverse direction; one or an array of apertures are formed in the gate electrode and the gate insulator at intersections, each aligned with and exposes one or a small cluster of nano-structure in the emitter layer; and the anode electrode is configured as an array of strip-like anode electrodes, each extending opposed to a corresponding gate electrodes. The intersection forms a pixel region corresponding to one pixel of a display.

An x-ray generator is formed, when the electron source, as is described above, is positioned in vacuum opposite to a third metal anode that is biased at a high electrical potential relative to the source. Electrons generated from the source by applying a voltage between the cathode and gate electrodes are accelerated by the high electrical field. When they strike on the anode, x-rays characteristic of the metal are generated. One or multiple electrostatic or magnetic optics can be inserted between the electron source and the metal anode for the purpose of conditioning, deflecting or focusing the electron beam.

The x-ray generator, described above, becomes a multiple x-ray generator when an anode with multiple metals are used and the electron beam, either emitted from the same area of the source and deflected by electron optics or from a corresponding area of an addressable source, strike on the different metals.

The x-ray generator becomes addressable when an addressable electron source is used and each of its pixel strikes a corresponding area on an anode, either a single anode or a multiple-metal anode.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1A shows a grid gated electron source using carbon thin film or CNT as emitter;

FIG. 1B shows an integrally gated emission electron source with multiple CNT in one aperture; and FIG. 1C shows an integrally gated field emitter with one vertically oriented CNT in each aperture and an aperture diameter larger than 2 micrometers;

FIG. 2A shows a section view from the front;

FIG. 2B shows the top view;

FIG. 3A shows a substrate;

FIG. 3B shows the deposition of cathode electrode on the substrate;

FIG. 3C shows the deposition and patterning of catalyst on the cathode;

FIG. 3D shows the growth of a vertically oriented CNT from each catalyst particle;

FIG. 3E shows the deposition of a conformal embedding dielectric over the CNT;

FIG. 3F shows the truncation of CNT by polishing;

FIG. 3G shows the formation of an emitter layer by a slight etch back of the embedding dielectric after CNT truncation;

FIG. 3H shows the conformal deposition of a gate insulator, and a line-of-sight deposition of a metal layer for the gate electrode;

FIG. 3I shows the formation of self-aligned gate aperture around each CNT after the removal of the gate insulator and the gate metal from the protruding part of the CNT.

FIG. 4A shows the section view after the deposition of a second dielectric and the gate electrode;

FIG. 4B shows the formation of the self-aligned gate aperture around each CNT after CMP and a slight etch back.

FIG. 5A illustrates how to form a self-aligned photo resist mask after the deposition of a second dielectric and the gate electrode;

FIG. 5B shows the top view after the formation of a self-aligned resist mask;

FIG. 5C shows the formation of self-aligned gate aperture around each CNT by using self-aligned resist mask to remove the gate metal and insulator on CNT.

FIG. 6A shows a section view with a CNT incline to the surface;

FIG. 6B shows a section view with a 3-CNT cluster in an aperture;

FIG. 6C shows top view of a single aperture exposing a small cluster of CNTs;

FIG. 6D shows a top view of a group of apertures with varied sizes and shapes in accordance with those of the exposed CNT clusters.

FIG. 8A on a concave surface;

FIG. 8B on a convex surface.

Reference designators used herein are: 20 CNT, 22—non-conductive nano-structure, 24 conductive coating on a non-conductive nano-structure, 30 the first electrode, 32 the second electrode, 34 gate aperture, 36 gate insulator, 40 substrate, 42 anode with phosphor screen, 50 catalyst, 52 an embedding dielectric material, 56 post, 58—photo resist, 60 UV illumination, 70 vacuum space between electron source and anode, 100 emitter layer, 200 electron source, 300 addressable electron source, 400 anode plate, 500 display, 600 double gated electron source, 610 the second gate insulator, 620 the second gate electrode,

700 x-ray tube, 710 metal anode, 720 x-ray, 730 x-ray window, 740 electron optical lenses, 750 vacuum envelope for x-ray device, 760 electron beam, 770 anode with multiple metals, 772 anode metal 1, 774 anode metal 2, 776 anode metal 3, 778, anode metal 4.

DETAILED DESCRIPTION OF THE INVENTION

Figure 1A:
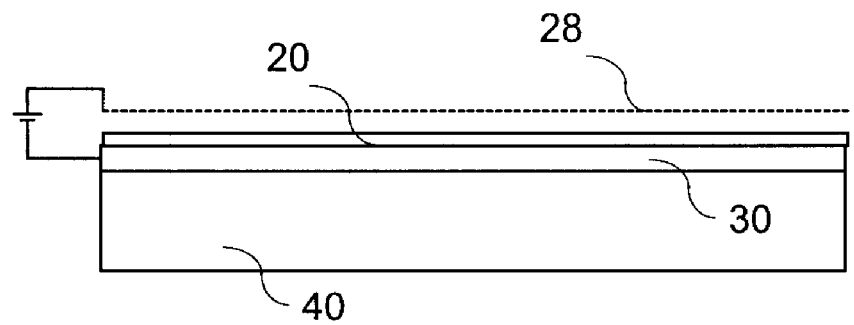
FIG. 1A through FIG. 1C are schematic illustrations of various prior electron source configurations.
Figure 1B:
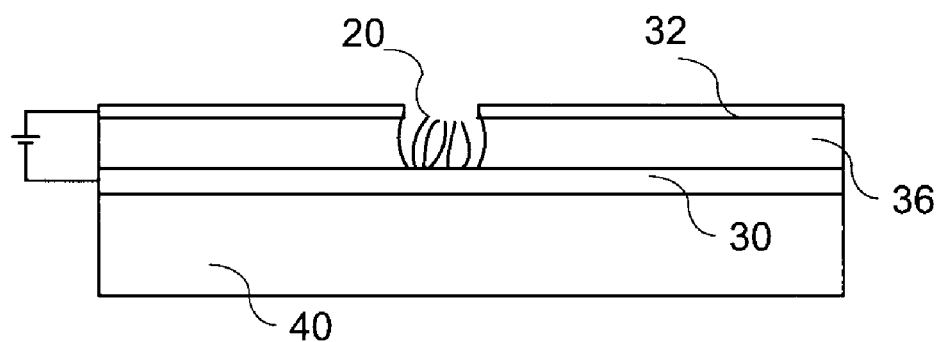
Figure 1C:
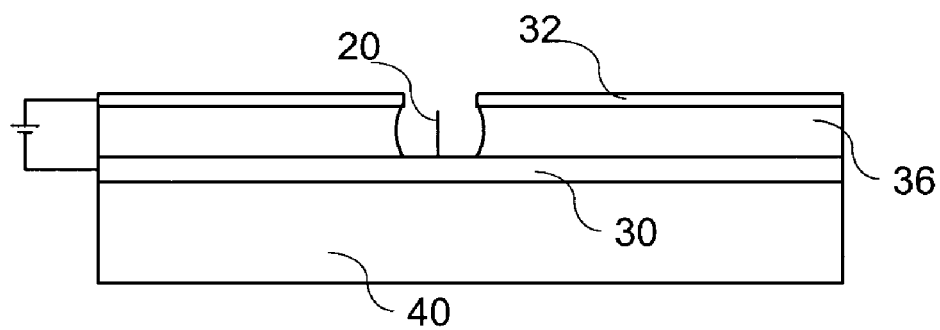
Figure 2:
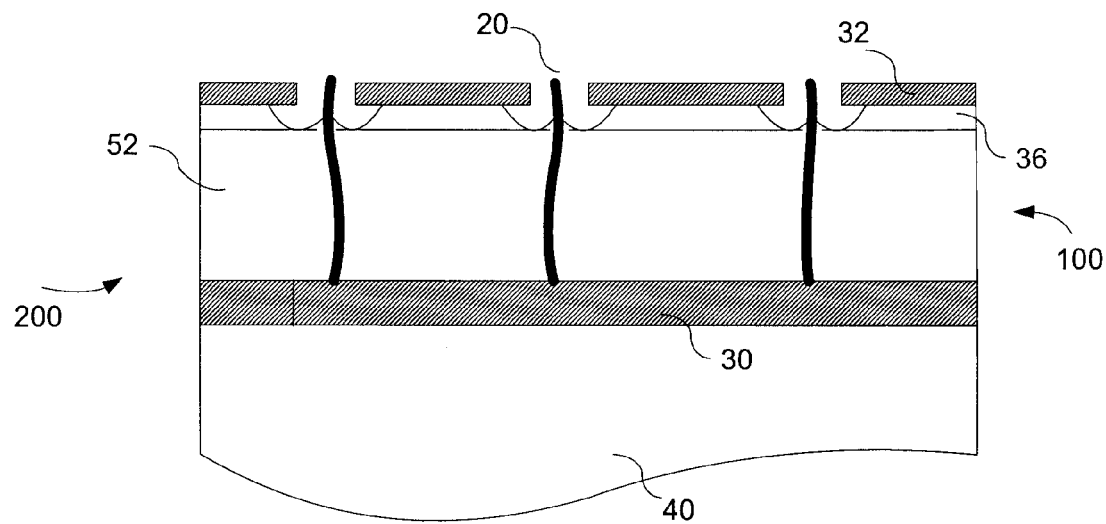
FIG. 2A-FIG. 2B show one embodiment of an electron source according to current invention.
Figure 2:
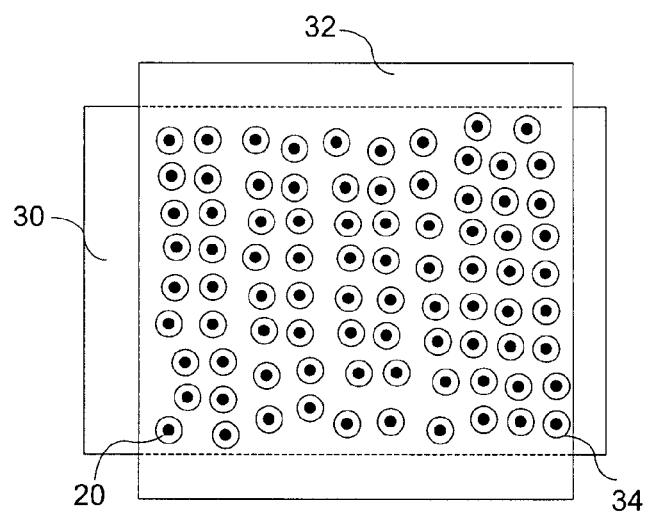

FIG. 2 illustrates an electron source 200 by current invention using vertically aligned and mono-dispersed CNT 20 as emitter. It includes a cathode electrode 30 deposited on a substrate 40; an emitter layer 100 disposed over the cathode and formed from an embedding dielectric 52 and an array of CNTs embedded therein, the emitter layer having a surface parallel to which the CNTs have been truncated to the same length, and above the surface the CNTs protrude by a small fraction of one micrometer; a gate insulator 36 disposed over the emitter layer of a thickness on the order of 100 nm and having an array of apertures, each aligned with and exposes one nano-structure in the emitter layer; and a gate electrode 32 deposited on the gate insulator and having an array of apertures 34 aligned with the apertures in the insulator and spaced from the exposed CNT by a distance equal to the thickness of the insulator. When a positive voltage is applied between the gate and the cathode electrodes, the gate apertures extract electrons from the CNTs.

Figure 3:
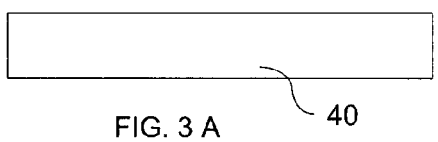
FIG. 3A through FIG. 3I illustrate the fabrication steps of the first embodiment of the current invention.
Figure 3:
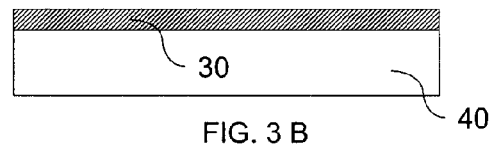
Figure 3:
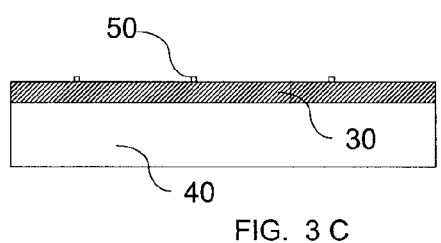
Figure 3:
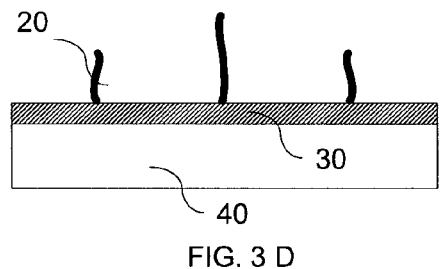
Figure 3:
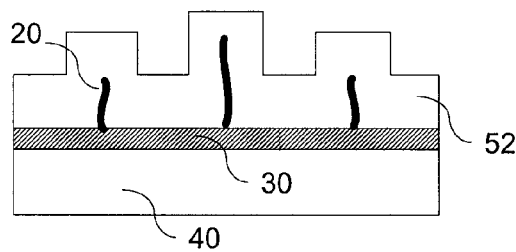
Figure 3:
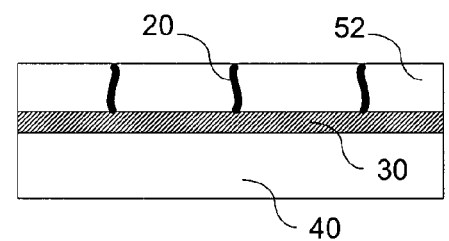
Figure 3:
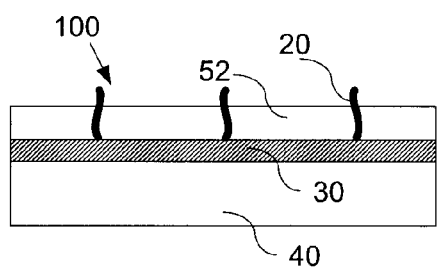
Figure 3:
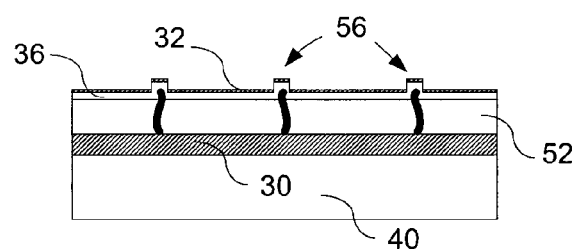
Figure 3:
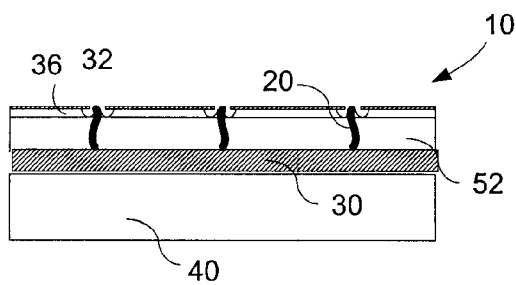

FIG. 3 depicts one of the possible fabrication process flows for the source shown in FIG. 2. Starting with an insulating substrate 40, such as a Si wafer or a glass plate, shown in FIG. 3A, a cathode metal 30, Cr for example, is deposited on to the substrate, as is shown in FIG. 3B. A patterned catalyst layer 50 of a few nm thick is then deposited onto the cathode, as is shown in FIG. 3C. The catalyst, Ni or Fe for example, can be deposited by thermal or e-beam evaporation through an ion-track-etched membrane laid on top of the substrate. After the deposition, the catalyst forms an array of particles on the cathode metal of a diameter and a surface density about 30 nm and $10^8/cm^2$ respectively, for instance. Vertically aligned CNT 20 is then grown by one of the known techniques, such as plasma enhanced chemical vapor deposition (PECVD), or thermal chemical vapor deposition (thermal CVD) with applied electrical field, with one CNT grown from each catalyst particle, as is shown in FIG. 3D. Since the diameter of the catalyst particles has a narrow distribution, the grown CNTs in the array are expected to have a consistent diameter. A dielectric 52, Silicon Oxide $SiO_2$, for example, is then conformally deposited until it completely or almost completely embeds the CNT, shown in FIG. 3E. A chemical mechanical planarization (CMP) process is then applied to the surface to truncate all the CNT to the same length and obtain a surface parallel to that of substrate, shown in FIG. 3F. A slight etch back of the embedding oxide is then performed so that ends of the truncated CNTs protrude from the surface for about 150 nm, forming an emitter layer 100, as is shown in FIG. 3G. A conformal coating of a gate insulator 36, such as $SiO_2$ again, is then applied to the surface with a thickness on the order of 100 nm, 75 nm for example, forming an array of posts 56 from the CNT. A line-of-sight deposition of a gate metal 32 of a thickness less than that of the gate insulator, 35 nm for example, is then followed for the gate electrode. As is shown in FIG. 3H, the line-of-sight deposition by, for example, e-beam evaporation will deposit the gate metal only on the top of the posts and on the surface of the insulator. An insulator etch is then performed to remove the coating on the CNTs from the side of the post and, at the same time, lift off the gate metal on the post, leaving a gate aperture 34 and a corresponding insulator aperture around each CNT, as is shown in FIG. 3I. As a result, an electron source with a perfectly aligned gate aperture, a gate to emitter distance less than 100 nm and an emitter density of $10^8/cm^2$ is completed without using any expensive and complicated lithography processes. Here $SiO_2$ has been used for both the embedding dielectric and the gate insulator. However, a second dielectric material different from that of the embedding dielectric can also be used for the gate insulator.

Figure 4:
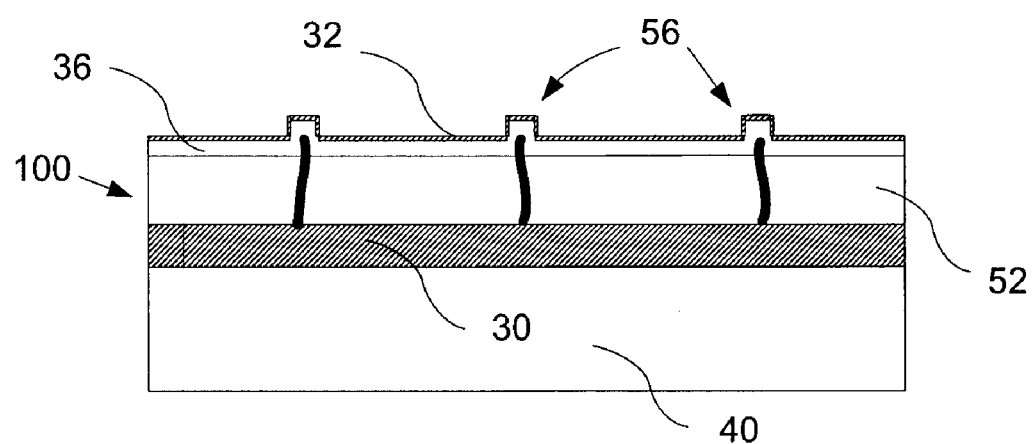
FIG. 4A and FIG. 4B show the formation of self aligned gate aperture by CMP.
Figure 4:
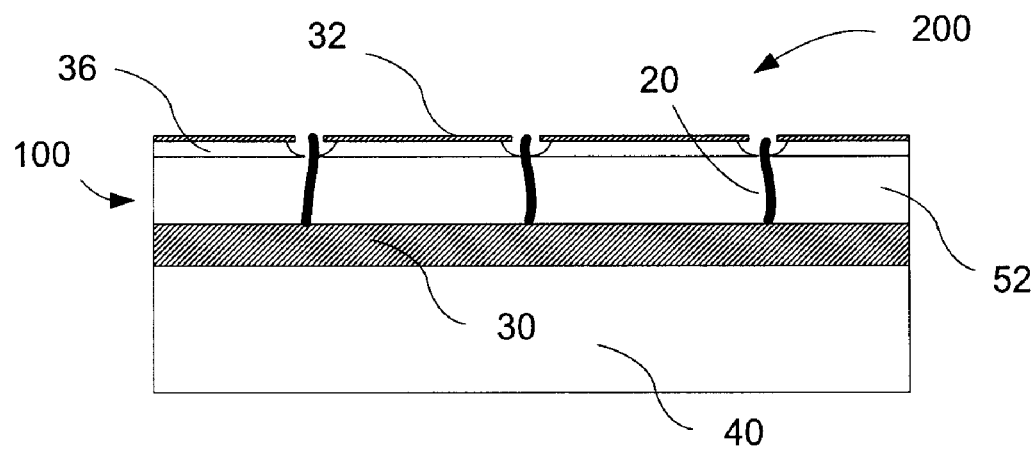

FIG. 4 shows an alternative way of fabricating the self-aligned gate aperture in accordance with the current invention. Repeating the steps described above until the deposition of the gate metal as is shown in FIG. 4A. Here the gate metal does not have to be thinner than the conformal insulator layer and it does not have to be deposited by a line-of-sight process either. When a CMP is then applied to remove the posts 56 and stop at the gate metal on the floor surface, an aligned gate aperture around each of the CNTs automatically forms. A slight etch back of the gate insulator is then applied, forming aligned apertures in the insulator to further expose the protruding portion of the CNTs in the emitter layer for emitting electrons, as is shown in FIG. 4B.

Figure 5:
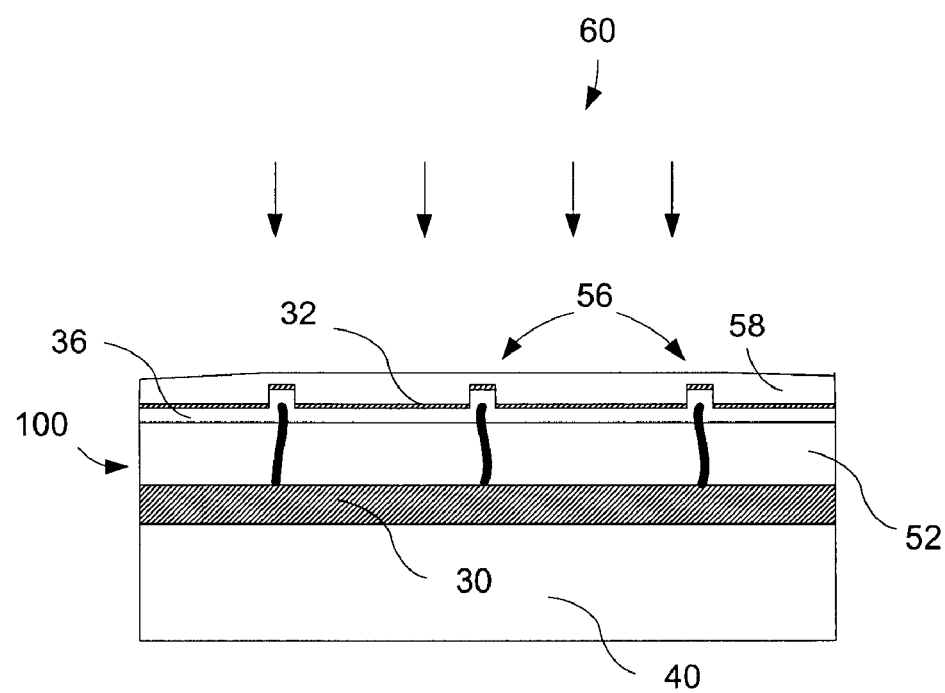
FIG. 5A through FIG. 5C show the formation of self aligned apertures by using photo resist as a etch mask.
Figure 5:
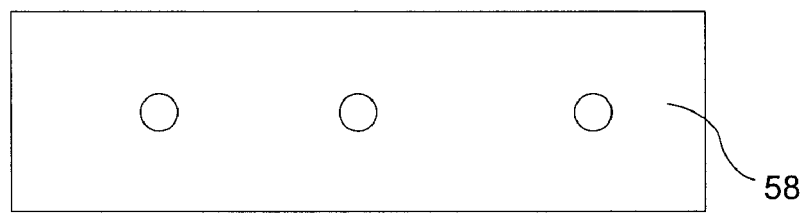
Figure 5:
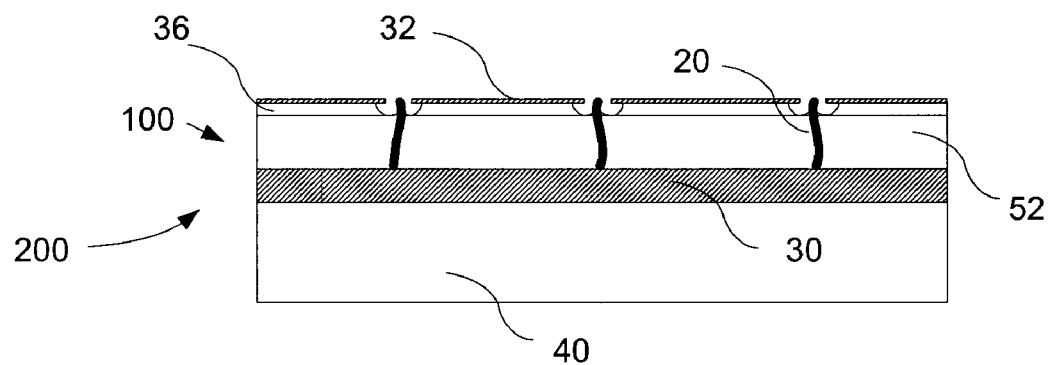

A third alternative is to coat the surface with a thick positive photo resist 58 after the deposition of the gate metal to planarize the surface, as is shown in FIG. 5A. The resist at the top of posts 56 will be substantially thinner than it is on the insulator surface at the bottom of the posts. A global UV illumination 60 is then applied with a dosage chosen such that only the resist on top of the post will be dissolved after resist development, forming a mask with opening only on top of the posts, as is shown in FIG. 5B. The gate metal and insulator are then removed from the posts by chemical etches. Removal of the resist mask results in apertures in the gate metal and the insulator around each CNT.

It is obvious to the ones who are skilled in the field that the above described methods of fabricating a self-aligned and nano-sized apertures around a vertically oriented and mono-dispersed nano-structure is independent of the way how the nano-structures are introduced onto the cathode electrode. Alternatives of introducing the nano-structures onto the surface include at least: growing nano-structures using such templates as porous alumna or silica, or assembling pre-fabricated nano-structures onto the surface. In case of using a template for growth, the template remains as part of the embedding material.

Figure 6A:
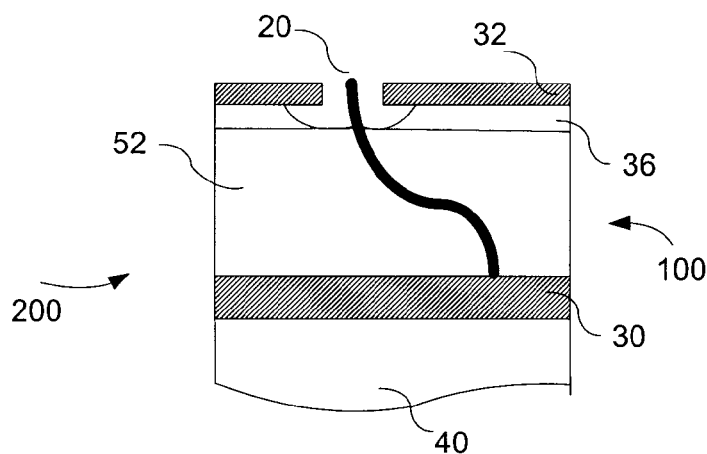
FIG. 6A-6D shows various configurations of the electron source according to the current invention.
Figure 6B:
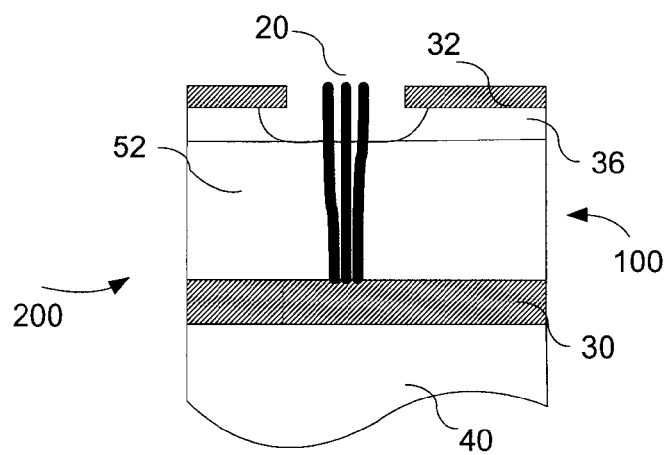
Figure 6C:
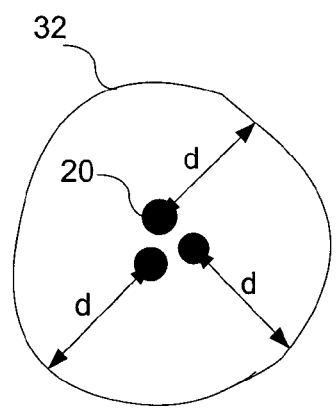
Figure 6D:
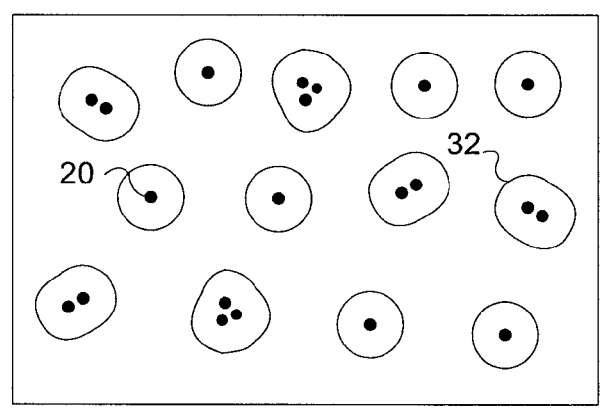

The above described methods of fabricating a self-aligned gate apertures should not be limited only to vertically oriented nano-structures. In fact, so long as the nano-structures are protruding from the surface of the emitter layer, the method is effective, as is shown in FIG. 6A. Even though the CNT is not vertical to the surface and the degree of inclination of each CNT can be different, each emitter will still have the same distance to the gate aperture and the tip of the emitter will still point to the direction vertical to the surface due to the CMP polishing. The same method should also be able to apply to small nano-structure clusters that are spaced apart, so long as the insulator layer is thicker than the distances between CNTs within each cluster such that the original posts from each CNT within the cluster merge into a single larger one. FIG. 6B show a cluster of 3 CNT in one such gate aperture. The gate aperture is concentric with the cluster and each CNT in the cluster has the same emitter-to-gate distance d, regardless their position in the cluster, as is shown in FIG. 6C. FIG. 6D shows a top view of an electron source with the emitters in singlet, doublet, or triplet configuration. Depending on the cross section shape of the single nano-structure or the cluster, the shape of the gate aperture varies. However, it is always concentric with the nano-structure or the cluster, and each emitter always has the same emitter-to-gate distance. As a result, each emitter experiences the same electron extraction field from the gate electrode, regardless it is a singlet or in a cluster.

Figure 7:
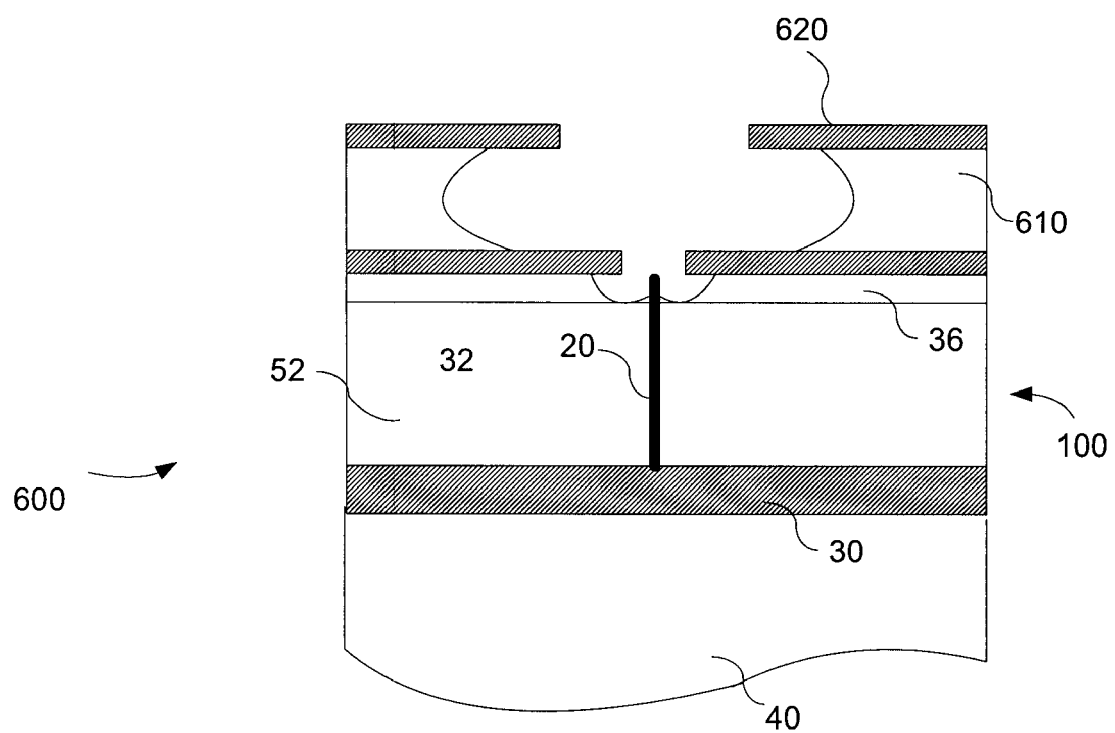
FIG. 7 shows a section view with a double gate electrode.

It is also obvious that if the gate insulator and gate metal deposition and removal processes are repeated, more than one self-aligned apertures can be fabricated around each emitter. FIG. 7 shows an electron source with a double gates, where two stacks of gate insulator and gate aperture layer were deposited before removing these layers from the nano-structures to expose their tips. The first gate will control the electron emission from the emitter and the second gate can be used to control the distribution of the electron beam from the emitter.

Figure 8A:
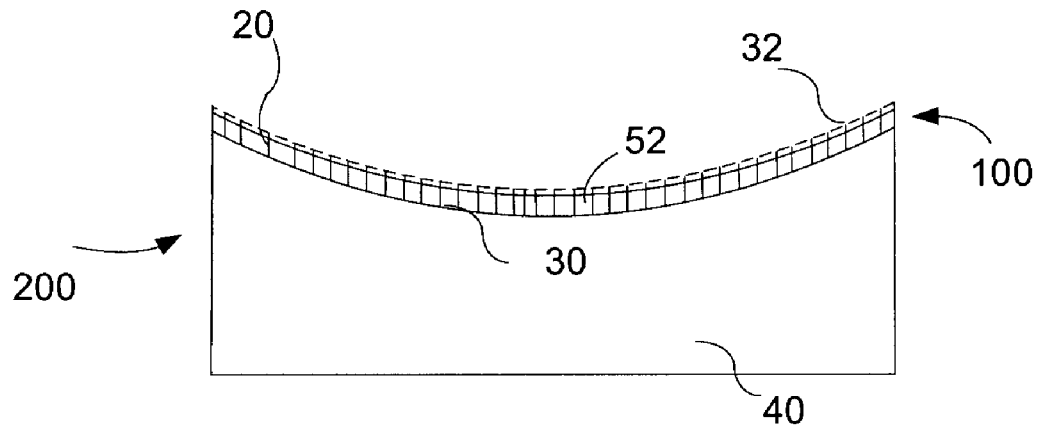
FIG. 8A-8B schematically shows an array of gated emitter on non-flat surfaces.
Figure 8B:
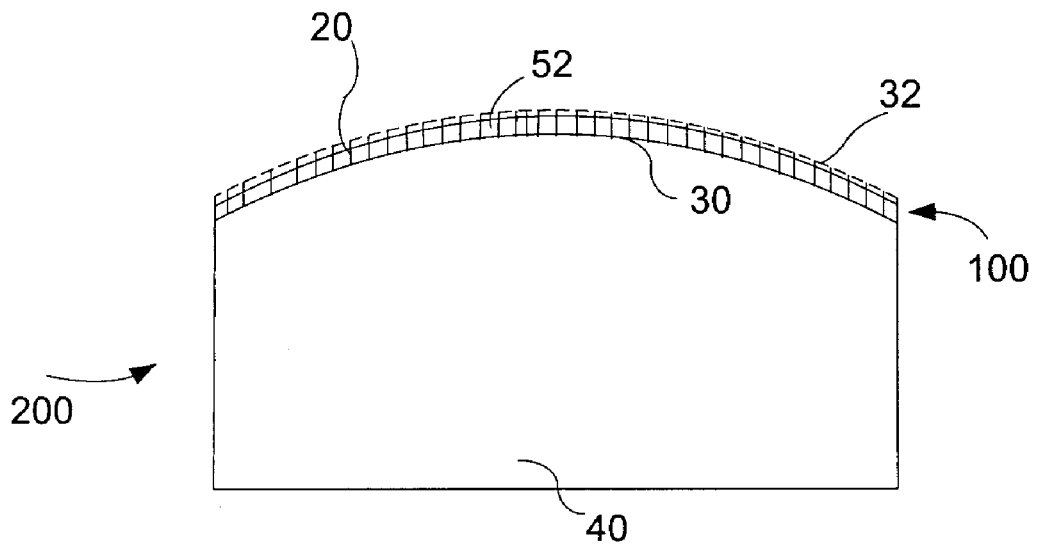

FIG. 8 shows a pattern of catalyst particles 50 formed from a deposition through an ion-track-etched membrane. A membrane with a pore density of $10^8/cm^2$ will result in an array of CNT with an average spacing of one micrometer between them, which is sufficiently ample for a gated structure that the diameter of the aperture is only a small fraction of it. There is a wide selection range for these track-etched membranes. Depending on applications, one could choose a membrane with a pore density anywhere between $10^5/cm^2$ and $5 \times 10^8/cm^2$, giving rise to an average spacing between 50 micrometers to 500 nm. As for pore size, those with pores less than 300 nm in diameter can be used to grow array of spaced-apart single CNTs, while those with pores sizes larger than 300 nm can be used to grow array of spaced-apart small CNT clusters, each has a few CNTs, 2 to 4, for instance. It should also be noted that ion-track-etched membranes sometimes can have a small fraction of pores that are larger than the designated size due to coincident of more than one ion at a close location in the membrane during membrane production The most common track-etched membranes are those of polycarbonate or polyester. To eliminate the outgasing of these plastics in a vacuum deposition chamber, one could use a membrane from other materials such as Cu or Al thin films. Using the track etched plastic membrane as an etch mask, one can easily transfer the pores size and distribution from the plastic film to that of other materials.

Spaced-apart and nano-sized catalyst particles can also be introduced onto the substrate by such processes as nano-imprint lithography and micro-stamp lithography, where particle size, inter-particles distance, and even the location of the particles can be precisely controlled by the pattern on a stamp or a mold.

Figure 9:
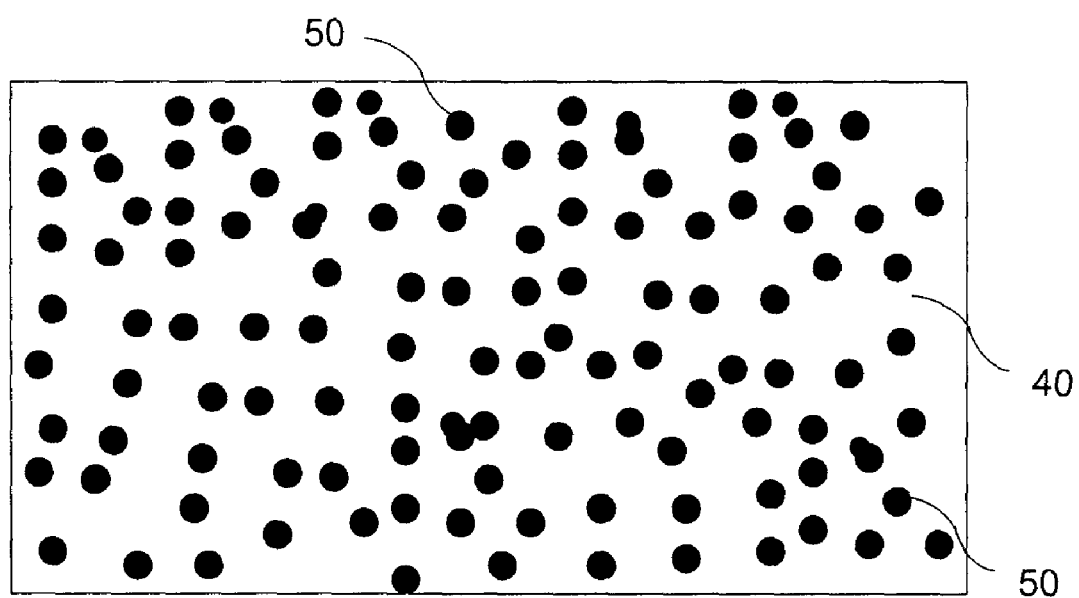
FIG. 9 shows a catalyst pattern formed using an ion-track-etched membrane as a mask.

Nano-structures from many materials can be used to replace CNT in the current invention. Examples of conductive nano-structure alternatives include refractory metal or alloy nano-wires; conductive ceramics or conductive ceramic composite nano-wires; carbon nano-fiber, carbon nano-cone and carbon nano-plane; conductive nano-structures with a thin film coating for enhanced field emission, such as W nano-wire coated with nano-diamond, or diamond like carbon; and composite nano-structures with a non-conductive core and a conductive shell or vise versa. Examples of non-conductive nano-structures include: BN nanotube, nano-wires of AlN, AlGaN, GaN, SiC, ZnO and diamond. There are two ways to provide electrons transportation from the cathode to tip of the non-conductive nano-structures. FIG. 9 depicts one of them. A conductive coating 24 of a thickness of the diameter of nonconductive nano-structure 22 is applied before the deposition of an embedding dielectric. The non-conductive nano-structures are, therefore, converted to a composite with a non-conductive core and a conductive shell. Alternatively, a conductive material is used to embed the nano-structures. The most desirable conductive coating or embedding materials include conductive ceramics, conductive ceramic composites and refractory metals and alloys.

The use of different nano-structures as emitter may also require the choice of different catalyst to be used. For CNT, typical catalysts include: transition metals and their compounds, such as Ni, Co or Fe. Sometimes, a diffusion barrier, such as TiN, may have to be deposited first to prevent the catalyst from diffusing into the cathode electrode during CNT growth. For other nano-structures, one of the often-used catalysts is Au. However, selection of proper catalyst for a particular nano-structure growth should be obvious to those skilled in the field.

The embedding material in the emitter layer can consist of multiple layers, such as a thin conductive layer at the bottom and a thicker insulator above. The conductive layer can enhance the electrical and thermal conductions at the interface between nano-structures and substrate.

A ballast resist layer, such as cermet, can also be applied between the nano-structure and the cathode electrode to even out electron emission from different emitters.

Optionally, either the diffusion barrier or the ballast resistor layer can be deposited at the same time when the catalyst is deposited through the track-etched membrane.

Figure 10:
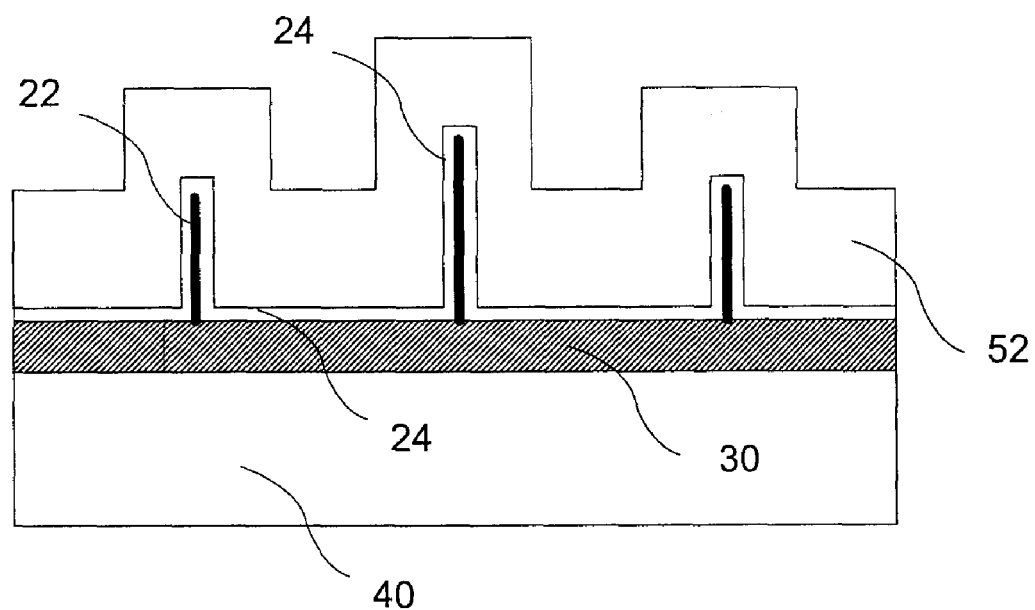
FIG. 10 shows the use of a non-conductive nano-structure as emitter and the conformal coating of a conductive layer prior to the deposition of a dielectric embedding material.

There are also other processes that can be used as an alternative to the CMP process to truncate and expose the CNT after the deposition of the embedding material. They include, at least, ion milling and electric discharge machining (EDM). In the case where the substrate surface is in a non-flat and predetermined shape, CMP can be performed against a mating surface or EDM with computer controlled program to achieve a desired surface topography to further modulate the distribution of the electron beams from emitters. FIG. 10 schematically shows an integrated electron source on surfaces in concave and convex shapes. The concave shape can facilitate the focusing of the electron beam. Conversely, the convex shape helps to spread the electron beam. Electron source with a complex surface topology can also be achieved by fabricating the electron source on a flat substrate, such as a Si-on-SiO2 wafer, first, releasing it from the flat substrate and bonding it to a surface machined to a pre-determined shape.

It should also be pointed out that there are many methods that can be utilized to change the relative position of the emitter and its gate aperture in order to optimize the distribution of the electron beam from each emitter cell. Examples of these methods include controlling the deposition thickness of the gate insulator relative to the height of the protruding portion of the nano-structures above the surface of the emitter layer; and changing the relative deposition rates of the gate insulator in the directions parallel and perpendicular to the substrate so as to control the aspect ratio of the posts formed from the nano-structures after the deposition of the gate insulator. Changing the deposition rates in different directions can be achieved by selecting an anisotropic deposition process, or by intentionally introducing etching, either simultaneously or sequentially, during the gate insulator deposition.

Figure 11:
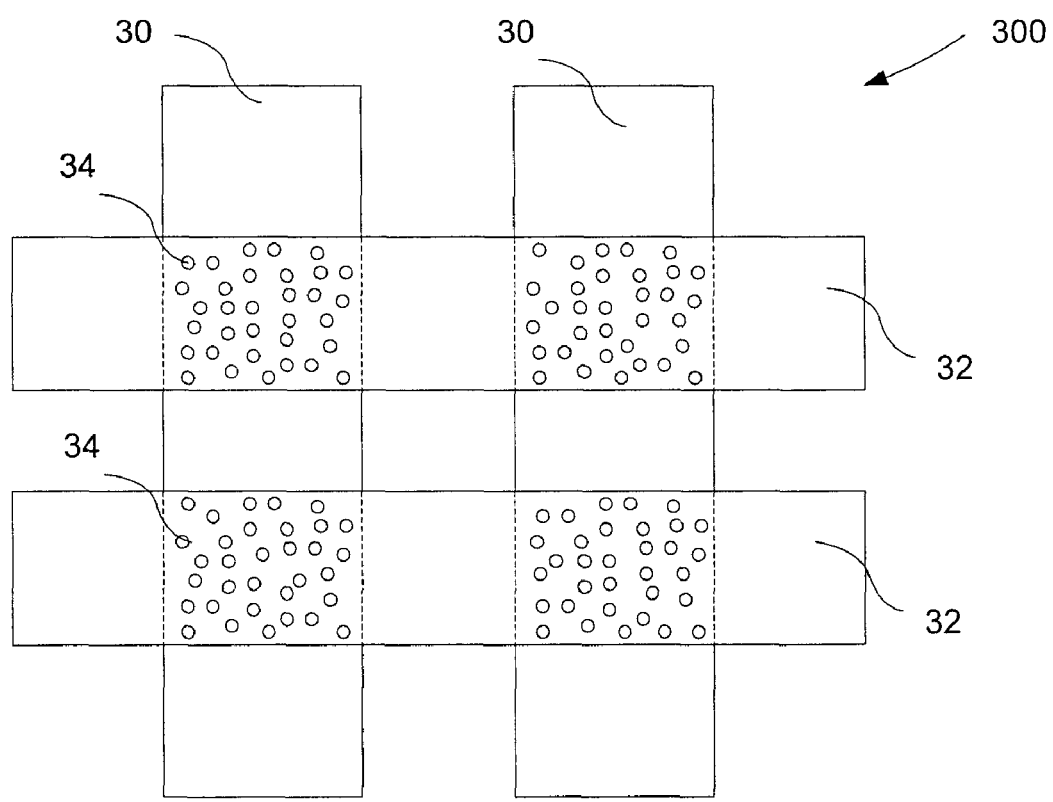
FIG. 11 shows a top view of an addressable electron source according to the current invention.

FIG. 11 schematically illustrates an addressable electron source 400 in accordance with the current invention. It includes: multiple electrically isolated cathode electrodes 30 extending on the substrate in one direction; an emitter layer disposed over the cathode electrodes and formed from an embedding material and multiple mono-dispersed or small cluster of dispersed nano-structures embedded therein, the nano-structures are truncated to the same length, protrude above the surface of the emitter layer and are distributed in patches along the cathode electrodes, and the density of the structures in each patch is as high as $10^8/cm^2$; a gate insulator of a thickness less than 100 nm being deposed over the emitter layer and having apertures aligned with and exposes each single or a small cluster of nano-structure in the emitter layer; and multiple electrically isolated gate electrodes 32 disposed over the insulator and extending in the orthogonal direction to intersect with each cathode electrode at the location where the nano-structure patches are; and multiple apertures 34 in the gate electrodes at each intersection that are aligned with apertures in the insulator and are spaced from the exposed nano-structure by a distance related to the thickness of the insulator. Activation of a selected cathode and a selected gate electrode determine the patch at the selected intersection, or the pixel, that emits electrons.

Figure 12:
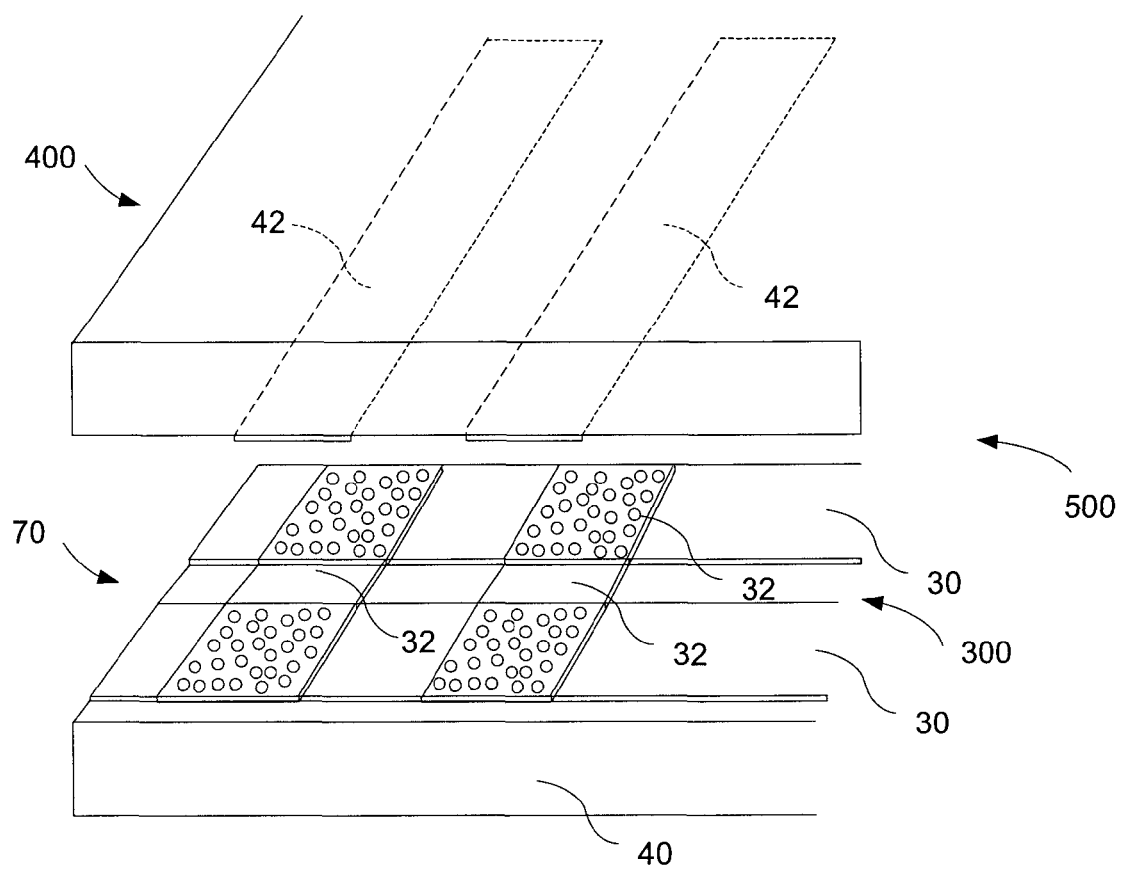
FIG. 12 shows a display according to the current invention.

FIG. 12 schematically illustrates an addressable display 500. An addressable electron source 300 on a glass substrate is positioned opposite and with a vacuum gap 70 from an anode plate 400. The anode plate consists of glass substrate, an array of transparent, parallel and electrically isolated anodes deposited on the glass and phosphor screens disposed over each anode electrode. ITO (Indium Tin Oxide) is one of the typical materials often used as a transparent electrode. The cathode electrode is configured as an array of strip-like cathode electrodes extending substantially in the same direction and to be spaced and electrically insulated from each other at intervals in the transverse direction. The nano-structures are distributed in patches along the cathodes with a density of, for instance, $10^8/cm^2$ in each patch. The gate electrode is configured as array of strip-like gate electrodes extending in the direction that intersect with the array of cathode electrodes at each patch of nano-structures and to be spaced and electrically insulated from each other at intervals in the transverse direction. Apertures are formed in the gate electrode and gate insulator, each aligned with and exposes one nano-structure in the emitter layer. The transparent anode electrode is configured as an array of strip-like anode electrodes, each extending opposed to the corresponding one of the gate electrodes. When a selected cathode and a selected gate electrode strip are activated, a selected intersection or pixel emits electrons and generates a light spot when the electrons strike the phosphor screen on the correspondingly selected anode electrode.

Figure 13:
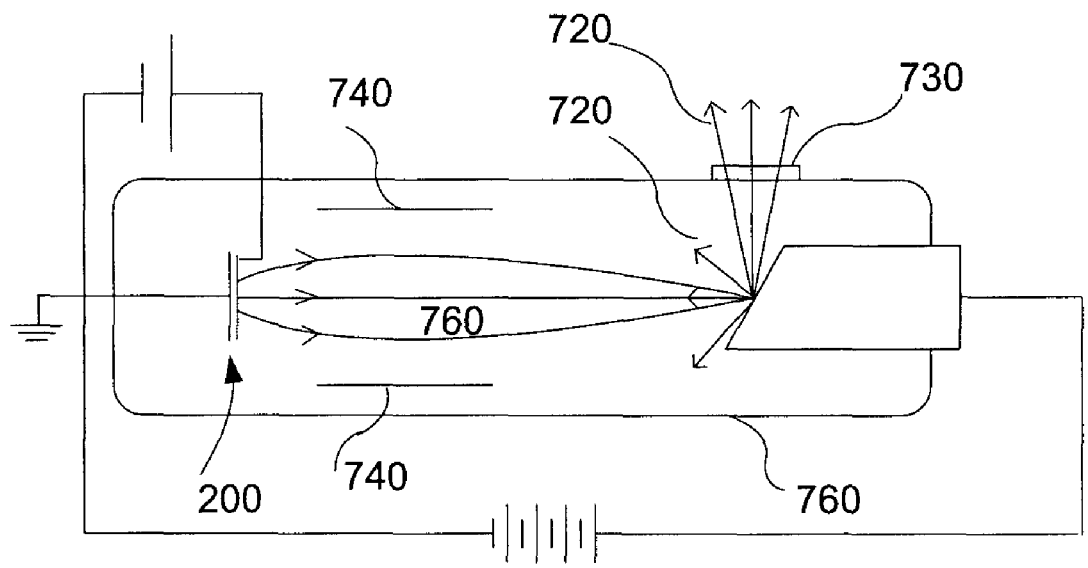
FIG. 13 shows schematic of an x-ray generator according to current invention.
Figure 14:
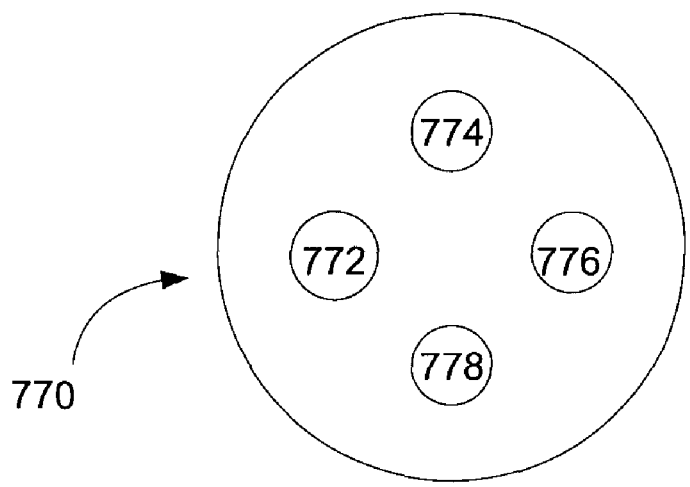
FIG. 14 shows schematic an x-ray anode with multiple metals.

FIG. 13 shows an x-ray device 600 according to the current invention. An electron source 200, as is described above, is positioned opposite to an anode metal 710 in a vacuum envelope 750. When a positive voltage is applied to the gate electrode, electrons emit from the source and are accelerated by high voltage, 20 to 400 kV, for example, towards the anode. When they strike the anode metal, Cu for example, x-rays are generated. A beam of x-ray 720 exits from a window, Be for example, in the vacuum envelope, and is ready for various applications. The spectrum of the x-ray is characteristic of the anode metal material. Electron optical lenses 740 or even magnetic can be inserted between the electron source and the anode so that the electron beam 760 can be focused or deflected onto the anode. If the anode consists of multiple spaced metals, as is shown in FIG. 14, the device can generate multiple x-rays of different spectra when electron beam, either being deflected from the same beam or being emitted from a different region of the electron source, strikes on different anode metals. A typical anode metal is a heavy metal that has a high x-ray yield and a high thermal conductivity, such as Cu or W, since the anode typically has to be able to absorb a large amount of energy over a small area from the electron beam 760. Applying metal coatings on different regions of an anode block is one way of fabricating the multiple-metal anode.

Compared to the conventional x-ray device, where the electron source typically requires heating, the device according the current invention will be less energy consuming, more robust, less expensive, smaller and weight less. More importantly, the device will be able to operate in high frequency. High frequency operation make it possible to use a much more energetic and high intensity electron beam in a short period of time over a small area, resulting in a much more penetrating x-ray or x-ray with smaller spot size.

Since the electron beam is on only a brief time during each cycle, less power is delivered to the anode. Therefore, less cooling will be required on the anode. As a result, the entire x-ray system is much simplified and become much more reliable.

When an addressable electron source according to the current invention is used in a device depicted in FIG. 13 and each of its pixel strikes a corresponding area on the anode, the x-ray generator becomes addressable and beam deflection will longer be needed for large area applications. For applications where small beam is desired, the electron source according current invention can deliver a small electron beam with high current density and low emittance. Therefore, less or no focus of the electron beam is needed. All these factors not only significantly simplify the design of the electron optics inside the device, but also significantly reduce the volume and weight of the device. In other words, the device can be made "flat" and "thin".

It is to be understood that the embodiments described above are illustrative of only a few of the many possible specific embodiments that can represent applications of the principles of the invention. Numerous and varied other arrangements can be readily devised by those skilled in the art without departing from the spirit and scope of the invention.

What is claimed is:

1. An emission electron source comprising:
a cathode electrode disposed on a substrate, the cathode electrode for providing a source of electrons;
an emitter layer disposed over said cathode electrode and formed from a composition of an embedding material and one or a plurality of small cluster of nano-structures embedded therein, the embedding material having a surface above which portion of the nano-structures protrude for emitting electrons;
an insulator disposed over the emitter layer, the insulator having one or a plurality of apertures, each exposing at least the ends of the small cluster of nano-structures in the emitter layer;
and a gate electrode disposed over the insulator and having one or a plurality of apertures, wherein each aperture exposes a small cluster of nano-structures and is concentrically aligned with the small cluster, the gate electrode being operative to control the emission of electrons through the apertures from the exposed nano-structures, wherein the shape of said gate aperture is substantially the same as the shape of the cross contour of the exposed cluster of nano-structures at the gate electrode.

2. An electron source as recited in claim 1, wherein the size of said gate aperture varies in accordance with the size of the exposed cluster, such that each exposed cluster has substantially the same distance from its cross contour to the gate electrode.

3. An electron source as recited in claim 2, wherein the distance from the gate electrode to the cross contour of the exposed cluster is substantially less than one micrometer.

4. An electron source as recited in claim 1, wherein said small cluster of nano-structures is randomly located.

5. An electron source as recited in claim 1, wherein said plurality of clusters is a random mix of clusters of varied sizes and cross contour shapes.

6. An electron source as recited in claim 1, wherein each within said cluster of nano-structures inclines or bends in random direction and extends substantially above the surface.

7. An electron source as recited in claim 1, wherein said surface of the embedding material is substantially parallel to the surface of the substrate and said nano-structures protrude above the embedding material at substantially the same length.

8. An electron source as recited in claim 1, wherein the emitter layer is substantially thicker than the insulator.

9. An electron source as recited in claim 1, wherein the thickness of the insulator is approximately equal to the vertical length of said protruding portion of the nano-structures.

10. An electron source as recited in claim 1, wherein the nano-structure comprises a core and a shell, wherein said core-and-shell nano-structure includes nano-structures with a nonconductive core and a conductive shell, nano-structures with a conductive core and a nonconductive shell, and nano-structures with a plurality of conductive and non-conductive layers.

11. An electron source as recited in claim 1, wherein the nano-structures include nano-tubes, nano-wires, nano-fibers, nano-cones, and nano-planes.

12. An electron source as recited in claim 1, wherein said insulator functions also as the embedding material.

13. An electron source as recited in claim 1, wherein the substrate surface is in a pre-determined shape for distribution of emitted electrons.

14. An electron source as recited in claim 13, where said substrate surface is in a concaved shape.

15. An electron source as recited in claim 1 further comprises one or a plurality of controlling gate electrodes deposited over said gate electrode and sequentially stacked on top of each other, each controlling gate electrode includes:
 a spacing insulator having one or a plurality of apertures, each exposing at least the ends of said small cluster of nano-structures in the emitter layer; and
 an electrode disposed over said spacing insulator and having one or a plurality of apertures, wherein each aperture exposes and is concentrically aligned with said small cluster of nano-structures;
 whereby activation of said controlling gate electrodes controls the distribution of electrons through said gate apertures from the exposed nano-structures.

16. An electron source as recited in claim 1,
 wherein the cathode electrode is configured as a plurality of electrically isolated cathode electrodes, each for supplying an independent source of electrons;
 wherein the gate electrode is configured as a plurality of electrically isolated electrodes, each intersecting with said plurality of cathode electrodes and having one or a plurality of apertures at each intersection, each gate electrode being operative to control the emission of electrons through the apertures along the gate electrode; and
 wherein activation of a selected cathode and a selected gate electrode determines an intersection where the nano-structures emit electrons.

17. A display comprising:
 an electron source that includes:
  a cathode electrode disposed on a substrate, the cathode electrode for providing a source of electrons;
  an emitter layer being deposed over the cathode electrode and formed from a composition of a embedding material and one or a plurality of small cluster of nano-structures embedded therein, the emitter layer having a surface above which a portion of the nano-structures protrude to emit electrons;
  an insulator disposed over the emitter layer, the insulator having one or a plurality of apertures, each exposing at least the ends of the small cluster of nano-structures in the emitter layer; and
  a gate electrode disposed over the insulator and having one or a plurality of apertures, wherein each aperture exposes a small cluster of nano-structures and is concentrically aligned with the cluster, the gate electrode being operative to control the emission of electrons through the apertures from the exposed nano-structures; wherein the shape of said gate aperture is substantially the same as the shape of the cross contour of the exposed cluster of nano-structures at the gate electrode; and
  an anode plate including a transparent anode electrode disposed over a glass substrate and a phosphor screen disposed over the anode electrode, the anode plate being positioned opposite to said electron source with a vacuum gap deposed therebetween;
 whereby electrons are emitted from said nano-structures by applying a voltage between said cathode and gate electrodes, and are made incident on said phosphor screen to make luminous said phosphor screen.

18. A display as recited in claim 17, wherein said surface of the embedding material is substantially parallel to the surface of the substrate and said nano-structures protrude above the embedding material at substantially same length.

19. A display as recited in claim 17,
 wherein the cathode electrode is configured as a plurality of strip-like cathode electrodes extending substantially in the same direction in such a manner as to be spaced from each other at intervals in the transverse direction, each cathode strip for providing an independent source of electrons;
 wherein the gate electrode is configured as a plurality of strip-like gate electrodes extending in such a manner as to intersect said plurality of cathode electrodes and to be spaced from each other at intervals in a direction transverse to the gate strips, and have one or a plurality of apertures at each intersections, each gate electrode for controlling the emission of electrons through the apertures along the gate electrode; and
 wherein the anode electrode is configured as a plurality of strip-like anode electrodes each extending in such a manner as to be opposed to the corresponding one of the said gate electrodes, each anode electrode for controlling the incident of said emitted electrons onto the anode electrode.

20. A method of fabricating an electron source having one or a plurality of self aligned gate apertures, each exposing a small cluster of nano-structure emitters, the method comprising:
 providing a substrate;
 depositing a first conductive layer;
 depositing one or a plurality of spaced apart small cluster of nano-structures, extending substantially above the surface;
 embedding the nano-structures with an embedding material;
 removing the embedding material from the top portion of the nano-structures so that part of said nano-structures protrude above the surface of the embedding material forming an emitting layer;
 comformally depositing an insulator over the emitter layer such that a post forms from each said protruding part of the cluster;
 depositing a second conductive layer over the insulator; and
 removing the second conductive layer and the insulator from the small cluster of nano-structures such that apertures are formed in the second conductive layer and at least the ends of the small cluster of nano-structures are exposed at the centers of said apertures,
 wherein the shape of said gate aperture is substantially the same as the shape of the cross contour of the exposed cluster of nano-structures at the gate electrode.

21. A method as recited in claim 20, wherein depositing the small cluster of nano-structures on the first conductive layer includes:
 depositing one or a plurality of spaced apart catalyst particles on the first conductive layer; and
 growing a small cluster of nano-structures from each said catalyst particle.

22. A method as recited in claim 20, wherein said plurality of small clusters is a random mix of clusters of varied sizes and cross contour shapes.

23. A method as recited in claim 20, wherein said small cluster of nano-structures is randomly positioned.

24. A method as recited in claim 20, wherein the density of the spaced apart small clusters is higher than 10^5/cm^2.

25. A method as recited in claim 20, wherein the distance from the cross contour of the cluster to the gate electrode is substantially less than one micrometer.

26. A method as recited in claim 20, wherein the thickness of said insulator is approximately the same as the vertical length of the protruding portion of the nano-structures above the surface of the embedding material.

27. A display as recited in claim 17,
wherein said plurality of clusters is a random mix of clusters of varied sizes and cross contour shapes.

28. A display as recited in claim 17, wherein said small clusters of nano-structures are randomly located.

29. A display as recited in claim 17, wherein the nano-structure comprises a core and a shell, wherein said core-and-shell nano-structure includes nano-structures with a nonconductive core and a conductive shell, nano-structures with a conductive core and a nonconductive shell, and nano-structures with a plurality of conductive and non-conductive layers.

* * * * *